Feb. 23, 1926.

T. MIDGLEY, JR 1,573,846

METHOD AND MEANS FOR USING MOTOR FUELS

Filed April 15, 1922

Witnesses
Irvin A. Greenwald
Lloyd M. Keighley

Inventor
Thomas Midgley Jr.
By Francis D. Hardesty
Attorney

Patented Feb. 23, 1926.

1,573,846

UNITED STATES PATENT OFFICE.

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE.

METHOD AND MEANS FOR USING MOTOR FUELS.

Application filed April 15, 1922. Serial No. 553,270.

*To all whom it may concern:*

Be it known that I, THOMAS MIDGLEY, Jr., a citizen of the United States of America, residing at Dayton, county of Montgomery, and State of Ohio, have invented certain new and useful Improvements in Methods and Means for Using Motor Fuels, of which the following is a full, clear, and exact description.

This invention relates to fuels, such, for example as kerosene and gasoline, employed in the operation of internal-combustion engines and to the art of burning the fuels in an engine. The present tendency is to produce lower grades of gasoline in order to obtain a sufficient output for the increasing demand for motor fuels and to reduce the compressions of the engines so that these lower grades of fuel may be used without knocking. As the lowering of engine compression reduces the efficiency of the engine, a still greater output of fuel is required to meet the increase in fuel required to operate larger and less efficient engines. The principal objects of the present invention are to overcome these difficulties and to provide a means for using either low or high grades of motor fuel more efficiently and so reduce the quantity of fuel used.

The present application is a continuation in part of my application Serial No. 464,985, filed April 27, 1921.

Figure 1:
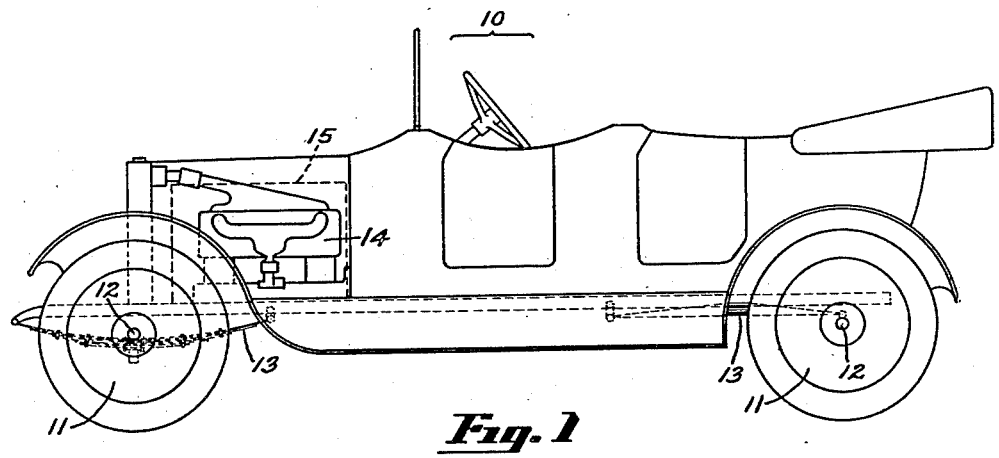
Figure 2:
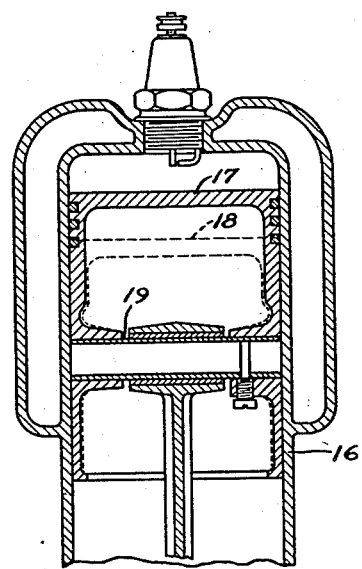

In the accompanying drawings:

Fig. 1 is a side view of an automobile having an engine embodying the present invention and showing the comparative sizes of engines employed when using high and low engine compressions; and Fig. 2 is a longitudinal sectional view of an engine cylinder and shows the comparative sizes of combustion chambers employed when using fuels having high and low critical compression pressures.

Kerosene, gasoline and the heavier hydrocarbons have the characteristic that, when a combustible gaseous mixture containing one of these fuels and air is burned in an internal-combustion engine while subjected to a relatively high pressure, a fuel knock is produced, the engine heats rapidly, the efficiency of the engine is reduced and, if the initial pressure is very high, engine parts may be injured. The highest pressure at which a mixture may be burned in a cylinder without producing a fuel knock varies with the different fuels and, to some extent, with the temperature, position of spark plugs and other conditions within the engine. This pressure I term the "critical compression pressure" of the fuel.

The average critical compression pressure of kerosene is about 50 pounds, of the proper grades of gasoline about 75 pounds and of the better grades of gasoline about 125 pounds. The latter grade of gasoline is produced in limited quantities and is not available universally to the consumer. The commoner grades of fuel, such as kerosene and gasoline, having critical compression pressures below 75 pounds are used generally, and in internal-combustion engines for house lighting systems, trucks, tractors, and automobiles are designed to operate on these kinds of fuel.

I have found that the critical compression pressure of a fuel of the type mentioned above is increased by incorporating therewith any one of a large number of compounds containing metallic elements, i. e., compounded metallic elements.

By way of example, I may use a fuel consisting by volume of ¼ of one percent of tetra ethyl lead and 99¾ percent of gasoline having a normal "critical compression pressure" of about 75 pounds. The tetra ethyl lead dissolves in the gasoline forming a fuel having a "critical compression pressure" of about 160 pounds. The presence of the lead compound changes the gasoline from a low compression fuel to a higher compression fuel, i. e., increases its "critical compression pressure." This gasoline may be used in an engine having a compression pressure of about 160 pounds, with a smaller fuel consumption for obtaining a given amount of work than is required to operate an engine having a compression pressure of 75 pounds on the untreated gasoline. Experiments with automobiles have shown that if the engine compression is increased to 160 pounds, a treated fuel being used to run the engine and the gear ratio between the engine and the rear axle is reduced, the mileage obtained from a gallon of gasoline is substantially twice that obtained when running the engine at 75 pounds compression on the untreated or low compression fuel.

In the drawings, 10 is an automobile having wheels 11, axles 12, springs 13, and an engine 14 whose compression pressure is about 160 pounds. This engine may be operated on the mixture of gasoline and tetra ethyl lead just described. At 15 is shown diagrammatically the comparative size of an engine operating on an engine compression of about 75 pounds and capable of delivering the same horse power as engine 14. It is apparent that by employing engine 14 instead of engine 15, the size and weight of the wheels, axles and other parts of the automobile may be materially lightened, and that by lightening the weight of the machine as a whole a still smaller engine may be employed to propel the vehicle.

Fig. 2 illustrates a method of changing the compression of an engine to obtain these results. In this figure, 16 is an engine cylinder and 17 the engine piston in its top dead center position in which the gaseous mixture is compressed to about 160 pounds. The dotted line 18 indicates the top dead center position of a piston which compresses the gases to about 75 pounds. A change from a low compression engine to a high compression engine may be made by substituting a piston whose length from the wrist pin 19 to the top of the piston is greater than in pistons in common use. This change in the pistons increases the horse power of the engine. Experience has shown that operation of an engine of the type illustrated in solid lines in Fig. 2, on a low compression fuel such as common gasoline, gives excessive heating, violent knocking, and under continued operation cracks the piston.

For some commercial purposes it will probably be sufficient to use but one part of tetra ethyl lead in 2000 parts of gasoline. This mixture may be used in a truck motor to avoid the knock generally produced when climbing hills at low speed with open throttle. Relatively small proportional quantities of the lead compound are required to increase the critical compression pressure of "aviation" gasoline from 125 pounds to 160 pounds or more.

The fuel mixture or combination may also be varied by using other fuels as the fuel base or major constituent of the high compression fuel and using other compounded metallic elements to increase critical compression pressure. The fuels used include gasoline and other hydrocarbon fuels containing hydrocarbons which may be obtained from an asphalt, naphthene paraffine base crude or mixtures thereof.

Other lead compounds which have been used successfully are the phenyl compounds and other alkyl compounds besides the tetra ethyl lead. These include the ethyl, isopropyl and methyl compounds. Methods of manufacturing lead compounds are described on page 133 et. seq., vol. 111 of Watts' Dictionary of Chemistry as revised by Morley and Muir and published by Longmans, Green and Co., London, England.

Other metallic compounds may be used to suppress a knock in a motor. These include compounds of selenium, tellurium, tin, arsenic and antimony. The phenyl and alkyl compounds of these metals have been successfully used where the stable compounds are obtainable. The alkyl metal compounds usually have a greater knock suppressing value than the corresponding phenyl compounds.

Dissolving a knock suppressing substance in a hydrocarbon fuel has been found the most satisfactory method of changing the critical compression pressure of the fuel, and for this reason the organic compounds have been employed to a greater extent than other compounds in suppressing knocks; however, I do not limit my invention to organic compounds nor to the oil soluble compounds.

The value of metallic compounds in changing the critical compression pressure depends upon the metal used, the composition of the compound, its stability and volatility. Up to the point of complete vaporization the anti-knock value depends in part on the percentage of the compound vaporized under engine conditions. Where the nature of the compound changes before ignition of the fuel, combustion of the fuel takes place in the presence of the new compound and the anti-knock value depends on the nature of the new compound instead of the compound added to the fuel.

If a radical is attached to the metal in the compound in such a manner that the resulting compound is oil soluble and volatile, a high anti-knock value for that metal is obtained. As the compound departs from these conditions either in the kind of radical employed or the number of radicals of a certain kind in the compound, the anti-knock value will generally be reduced. Examples of compounds in which the anti-knock value, as based on these conditions, becomes negligible are lead oleate and lead acetate. If, in the formula for tetra-ethyl lead, an OH radical is substituted for an ethyl radical, the resulting compound (triethyl lead hydroxide) is less volatile and less soluble in the fuel than the tetra ethyl lead. The tri-ethyl lead hydroxide is almost as powerful a knock-suppresser as the tetra ethyl lead.

The value of a compounded metallic element as a knock suppresser appears also to be a period function of the atomic number and, in general, with similar elements increases with increasing atomic weight. To illustrate this function, I take the ethyl compounds of the metals in the right hand column of the 4th, 5th, and 6th groups, wherever stable ethyl compounds are obtainable. As the ethyl compound of antimony is unstable in the air at room temperature, I employ the phenyl compound of antimony. These compounds increase in knock suppressing value in group 4 in the order tin, lead; in group 5 in the order arsenic, antimony; and in group 6 in the order selenium, tellurium. Taking group 4 as an example, 1% by volume of the ethyl compounds of the metals in gasoline or kerosene give the following increases in critical compression pressure: tin, 15 pounds; lead at the rate of 340 pounds when employed in relatively small quantities.

While I have mentioned more particularly the use of phenyl and alkyl compounds of certain metals for increasing the critical compression pressure of kerosene and gasoline, my invention is not limited wholly to the use of these compounds, nor to compounds of these metals, and the compounded metallic elements may be employed with the heavier hydrocarbon or other fuels.

Further, while the specific examples herein given constitute preferred forms of embodiment of the invention, it is to be understood that other forms might be adopted, without departing from the scope of the claims which follow.

What I claim is as follows:

1. A fuel for internal combustion engines comprising a low compression motor fuel, and a volatile compound of a metal adapted to increase the critical compression pressure of the motor fuel.

2. A fuel for internal combustion engines comprising a low compression motor fuel, and an oil soluble volatile compound of a metal adapted to increase the critical compression pressure of the motor fuel.

3. A fuel for internal combustion engines comprising a low compression motor fuel, and a relatively small amount of compound consisting of a metal bound to a hydrocarbon radical.

4. A fuel for internal combustion engines comprising a low compression motor fuel, and a relatively small amount of a volatile compound consisting of a metal bound to a hydrocarbon radical.

5. A fuel for internal combustion engines comprising a low compression motor fuel, and a relatively small amount of oil soluble compound consisting of a metal bound to a hydrocarbon radical.

6. A fuel for internal combustion engines comprising a low compression motor fuel, and a relatively small amount of a volatile and oil soluble compound consisting of a metal bound to a hydrocarbon radical.

7. A fuel for internal combustion engines comprising a hydrocarbon motor fuel containing a relatively small proportion of an alkyl compound of a metal containing more than two alkyl groups.

8. A fuel for internal combustion engines comprising a hydrocarbon motor fuel containing a relatively small proportion of an oil soluble compound of a metal containing more than two alkyl groups.

9. A fuel for internal combustion engines comprising a hydrocarbon motor fuel containing a relatively small proportion of a volatile compound of a metal containing more than two alkyl groups.

10. A fuel for internal combustion engines comprising a hydrocarbon motor fuel containing a relatively small proportion of a volatile and oil soluble compound of a metal containing more than two alkyl groups.

11. A fuel for internal combustion engines comprising a hydrocarbon motor fuel containing a relatively small proportion of an alkyl compound of a metal containing more than three alkyl groups.

12. A fuel for internal combustion engines comprising a hydrocarbon motor fuel containing a relatively small proportion of an oil soluble compound of a metal containing more than three alkyl groups.

13. A fuel for internal combustion engines comprising a hydrocarbon motor fuel containing a relatively small proportion of a volatile compound of a metal containing more than three alkyl groups.

14. A fuel for internal combustion engines comprising a hydrocarbon motor fuel containing a relatively small proportion of a volatile and oil soluble compound of a metal containing more than three alkyl groups.

15. A fuel for internal combustion engines comprising kerosene or gasoline; and a volatile alkyl compound of a metallic element homogeneously incorporated therein.

16. A fuel for internal combustion engines comprising a low compression motor fuel; and a volatile ethyl compound of a metallic element homogeneously incorporated therein and adapted to be vaporized in an internal-combustion engine before combustion of the fuel therein.

17. A fuel for internal combustion engines comprising a low compression motor fuel; and an alkyl compound of a metal in the right hand column of a group between the third and seventh groups of Mendeleef's table.

18. A fuel for internal combustion engines comprising a low compression motor fuel; and a volatile lead compound homogeneously incorporated therein.

19. A fuel for internal combustion engines comprising a low compression motor fuel; and an alkyl compound of lead.

20. A fuel for internal combustion engines comprising kerosene or gasoline; and an ethyl compound of lead.

21. A fuel for internal combustion engines comprising gasoline; and tetraethyl lead.

In testimony whereof I hereto affix my signature.

THOMAS MIDGLEY, JR.

Certificate of Correction.

It is hereby certified that in Letters Patent No. 1,573,846, granted February 23, 1926, upon the application of Thomas Midgley, Jr., of Dayton, Ohio, for an improvement in "Methods and Means for Using Motor Fuels," an error appears in the printed specification requiring correction as follows: Page 1, line 62, for the word "proper" read *poorer*; and that the said Letters Patent should be read with this correction therein that the same may conform to the record of the case in the Patent Office.

Signed and sealed this 22d day of June, A. D. 1926.

[SEAL.]
M. J. MOORE,
*Acting Commissioner of Patents.*